United States Patent [19]

Berry et al.

[11] Patent Number: 4,704,263

[45] Date of Patent: Nov. 3, 1987

[54] PRODUCTION OF POTASSIUM PHOSPHATES BY ION EXCHANGE

[75] Inventors: W. Wes Berry; William R. Erickson, both of Lakeland, Fla.

[73] Assignee: Advanced Separation Technologies Incorporated, St. Petersburg, Fla.

[21] Appl. No.: 748,187

[22] Filed: Jun. 24, 1985

[51] Int. Cl.$^4$ ............................................. B61D 15/02
[52] U.S. Cl. .................................. 423/312; 210/670; 210/687; 423/167; 423/308
[58] Field of Search ....................... 210/676, 670, 687; 423/167, 308, 312

[56] References Cited

U.S. PATENT DOCUMENTS

| | | | |
|---|---|---|---|
| 3,231,492 | 1/1966 | Stine et al. ......................... | 210/676 |
| 3,956,464 | 5/1976 | Drechsel et al. . | |
| 4,008,307 | 2/1977 | Loest et al. ........................ | 423/127 |
| 4,012,491 | 3/1977 | Hauge . | |
| 4,024,225 | 5/1977 | Chiang . | |
| 4,029,743 | 6/1977 | Hauge . | |
| 4,100,261 | 7/1978 | Ehlers et al. . | |
| 4,113,842 | 9/1978 | McCullough et al. . | |
| 4,293,423 | 10/1981 | Kosaka et al. ..................... | 210/676 |
| 4,412,866 | 11/1983 | Schoenrock et al. ............... | 210/676 |
| 4,552,726 | 6/1985 | Berry et al. . | |
| 4,591,439 | 5/1986 | Grot .................................. | 210/670 |
| 4,599,225 | 7/1986 | Dickey ............................... | 210/670 |

OTHER PUBLICATIONS

Kirk–Othmer, Encyclopedia of Chemical Technology, Vol. 13, Third Edition (1981), John Wiley & Sons, pp. 678, 679.

Primary Examiner—John Doll
Assistant Examiner—Wayne A. Langel
Attorney, Agent, or Firm—Burns, Doane, Swecker & Mathis

[57] ABSTRACT

A process for producing potassium phosphates by ion exchange using an Advanced Separation Device (ASD) is disclosed. The process is carried out by supplying a phosphate salt solution, a washing solution and a potassium salt regeneration solution to respective fixed feed ports in periodic fluid communication with a plurality of resin-filled chambers moving about a circular path. Passage of the phosphate salt solution through potassium loaded resin forms potassium phosphates and cation loaded resin by ion exchange. After washing out residual salts, the cation loaded resin is regenerated by adding a potassium salt which loads the resin with potassium and strips it of the cation in the form of a soluble cation salt.

By virtue of the ASD, potassium phosphate may be produced continuously and with greater efficiency than is possible with conventional ion exchange processes since the potassium salt and phosphate salt feed solutions may be fortified in an intra-stage fashion, i.e. during the course of the ion exchange or regeneration stages. In similar fashion, the pH may be adjusted in an intra-stage fashion.

14 Claims, 3 Drawing Figures

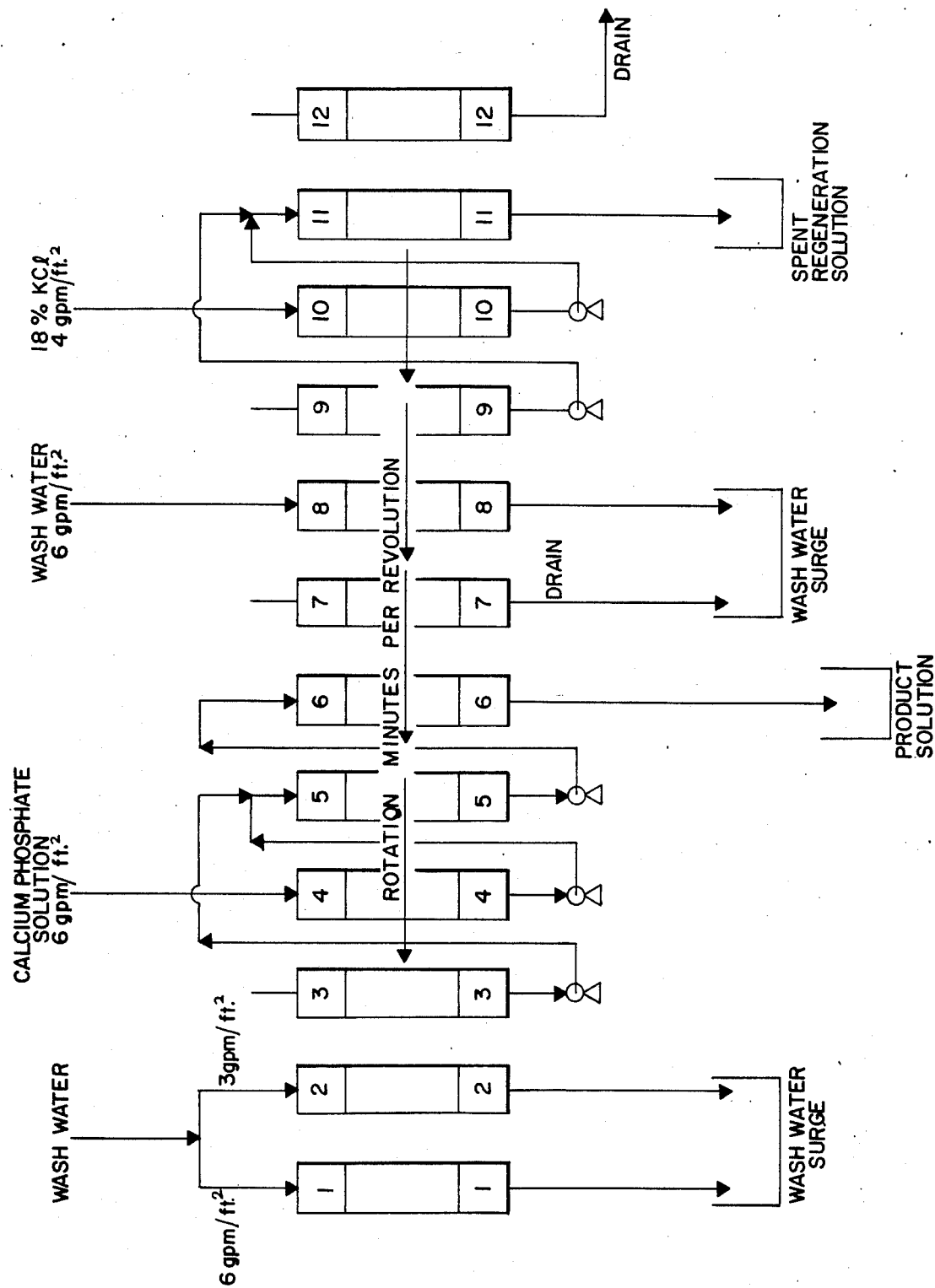

PRODUCTION OF POTASSIUM PHOSPHATES BY ION EXCHANGE

BACKGROUND OF THE INVENTION

The present invention relates to a process for producing potassium phosphate and more particularly to an ion exchange process wherein a metal phosphate salt solution is passed through a potassium loaded exchange resin so as to effect an exchange of potassium and the metal.

Since both potassium and phosphates are plant nutrients, potassium phosphate is a very effective fertilizer. Additionally, since it may be used with very little inert material present, it is easier to apply and may be transported relatively inexpensively.

Thus, in U.S. Pat. No. 4,008,307, an ion exchange process for producing potassium phosphate is disclosed which utilizes the potassium sulfate by-product from processes for the recovery of aluminum from alunite. More specifically, potassium ions from potassium sulfates are loaded onto a resin and then exchanged with phosphoric acid to yield the potassium phosphate.

Although effecting the desired exchange, the process is carried out in a single fixed bed exchange column and is therefore not very efficient since the process cannot be carried out continuously but rather, requires that the flow of materials be interrupted so that the resin can be regenerated. Additionally, fixed bed columns inherently require the presence of far greater amounts of resin than are actually being used at any given point in time due to the limited volume of the exchange zone, which proceeds downwardly as the upper layers of resin become spent. This requires that a far greater amount of resin be provided in the column than is actually being used in the exchange process at any one time, which translates into increased costs not only in terms of the additional quantities of resin required but also in terms of larger and more expensive equipment and higher processing costs. Another disadvantage inherent in fixed bed ion exchange systems for producing potassium phosphate stems from the fact that by the time the exchange zone nears the bottom of the column, the concentration gradient between the potassium bound to the resin and the exchange cation in the feed solution will have been substantially diminished thereby resulting in a concomitant reduction in the exchange efficiency.

Generally, when ion exchange processes are carried out in conjunction with high capacity exchange resins i.e., resins which become spent only after a large number of bed volumes of feed material have passed therethrough, it is not that detrimental that far greater amounts of resin are required since regeneration of the resin, as well as interruptions in the process to effect the same, will be infrequent. However, when the exchange resin is such that it does become loaded rapidly, then interruptions obviously take on greater significance and can cause a substantial decrease in the overall process efficiency. In similar fashion, since low capacity resins do require more frequent regeneration, it is especially important that the capacity which does exist, however limited, be used to the fullest extent possible.

Unfortunately, many of the exchange resins found to be most suited to potassium phosphate production fall into the low capacity category and become spent after only a few bed volumes of reactant have passed therethrough. Thus, resort has to be made to unduly large exchange columns having the aforementioned disadvantages in terms of excessive amounts of resin and diminishing concentration gradients as the feed materials proceed down the column.

Additionally, since the concentration of phosphate in the effluent being discharged from the first column in a fixed bed system has typically not yet reached commercially desirable levels, it is necessary to feed the effluent into yet another column. This amplifies the problem of excessive resin. Further, since the effluent will obviously contain depleted levels of feed materials, it will be necessary, in order to maintain a suitable concentration gradient, to fortify the effluent with additional feed materials. Such gives rise to extraordinary difficulties in terms of controlling the flow of materials in the process. More specifically, since the feed materials introduced into the one or more serially connected chambers as well as into the effluent streams would have to be frequently re-directed depending on whether or not the resin is being loaded, unloaded or treated in some other fashion, a very complicated valving system or the like would be required to monitor and regulate the flow of materials.

It will be readily appreciated therefore that it would be a difficult if not insurmountable task, in conjunction with a fixed bed system, to:

(i) carry out the process continuously, with the resin being regenerated with fresh potassium at least as quickly as it is spent by the exchange of the potassium with the phosphate salt feed material;

(ii) minimize the amount of resin in the exchange chambers, even though the resin is of the low capacity type; and (iii) maintain a suitable concentration gradient between the phosphate salt feed and the potassium loaded onto the resin so as to ensure that the final product contains high enough levels of potassium phosphate.

Other processes for producing potassium phosphate have been devised, some of which are carried out by reacting two components such as a potassium salt and a metal phosphate directly i.e., without using an ion exchange column. However, these processes often require very expensive or difficult to obtain starting materials or alternatively, require very complicated processing conditions which render costs of such processes prohibitive.

Not surprisingly, therefore despite the advantages provided by potassium phosphates as fertilizers, they have not gained widespread acceptance due to the prohibitive costs of their production.

SUMMARY AND OBJECTS OF THE INVENTION

In view of the foregoing limitations and shortcomings of prior art processes, as well as other disadvantages not specifically mentioned above, it should be apparent that there exists a need in the art for an economical ion exchange method for producing potassium phosphates. It is, therefore, a primary objective of this invention to fulfill that need by providing an ion exchange process for producing potassium phosphate which can be carried out continuously with inexpensive and readily available starting materials and which is highly efficient, with maximum utilization of exchange resin being achieved.

More particularly, it is an object of the invention to provide a process for producing potassium phosphate continuously and with a higher degree of efficiency than heretofore possible by employing in conjunction with said process an Advanced Separation Device (ASD) which enables the effluent streams of each of the processing stages, having depleted levels of reactant, to be simultaneously and continuously fortified in an intra-stage fashion with additional reactant material.

It is a further object of this invention to provide a process for producing a commodity type high analysis potassium phosphate fertilizer from low grade phosphate rock.

Briefly described, those and other objects of the invention are accomplished by providing an ion exchange process for producing potassium phosphate from a metal phosphate salt and potassium loaded resin using the ASD which comprises a plurality of resin-filled chambers which rotate about a circular path in periodic fluid communication with a plurality a fixed feed and discharge ports located at opposite ends of the chambers. The process may be carried out in four stages, each stage corresponding to one or more fixed feed ports. The first stage is an ion exchange process wherein a phosphate salt solution passes through one or more fixed feed ports and is delivered to the potassiumloaded resin to produce potassium phosphate and a resin loaded with the cation of the salt. In the second stage, a washing fluid is passed through a first set of one or more fixed washing fluid feed ports where it is then delivered to the cation-loaded resin so as to remove any entrained potassium phosphate solution or unexchanged metal phosphate salt material. A regeneration fluid such as potassium chloride is then supplied to the cation-loaded resin so as to form regenerated potassium loaded resin and the chloride salt of the cation. Finally, a second washing fluid feed is supplied to a second set of one or more fixed washing fluid feed ports where it is then delivered to the potassium loaded resin so as to remove residual amounts of the chloride salt of the cation or potassium chloride.

The above-described ASD arrangement makes it possible to add additional calcium phosphate or pH adjusting materials during the course of the ion exchange process thus allowing for a more complete reaction and more efficient utilization of the resin.

With the foregoing and other objects, advantages, and features of the invention that will become hereinafter apparent, the nature of the invention may be more clearly understood by reference to the following detailed description of the invention, the appended claims, and the drawings.

BRIEF DESCRIPTION OF THE DRAWINGS

FIG. 3 is a schematic view illustrating a process for producing potassium phosphate using the ASD.

DETAILED DESCRIPTION OF PREFERRED EMBODIMENTS

The process of the present invention is carried out in the Advanced Separation Device (ASD) which enables continuous ion exchange between the calcium phosphate feed solution and the potassium loaded resin when incorporated with the overall process of the present invention. The ASD is described in detail in assignee's copending application Ser. No. 713,492, filed March 19, 1985, the disclosure of which is hereby incorporated by reference.

Figure 1:
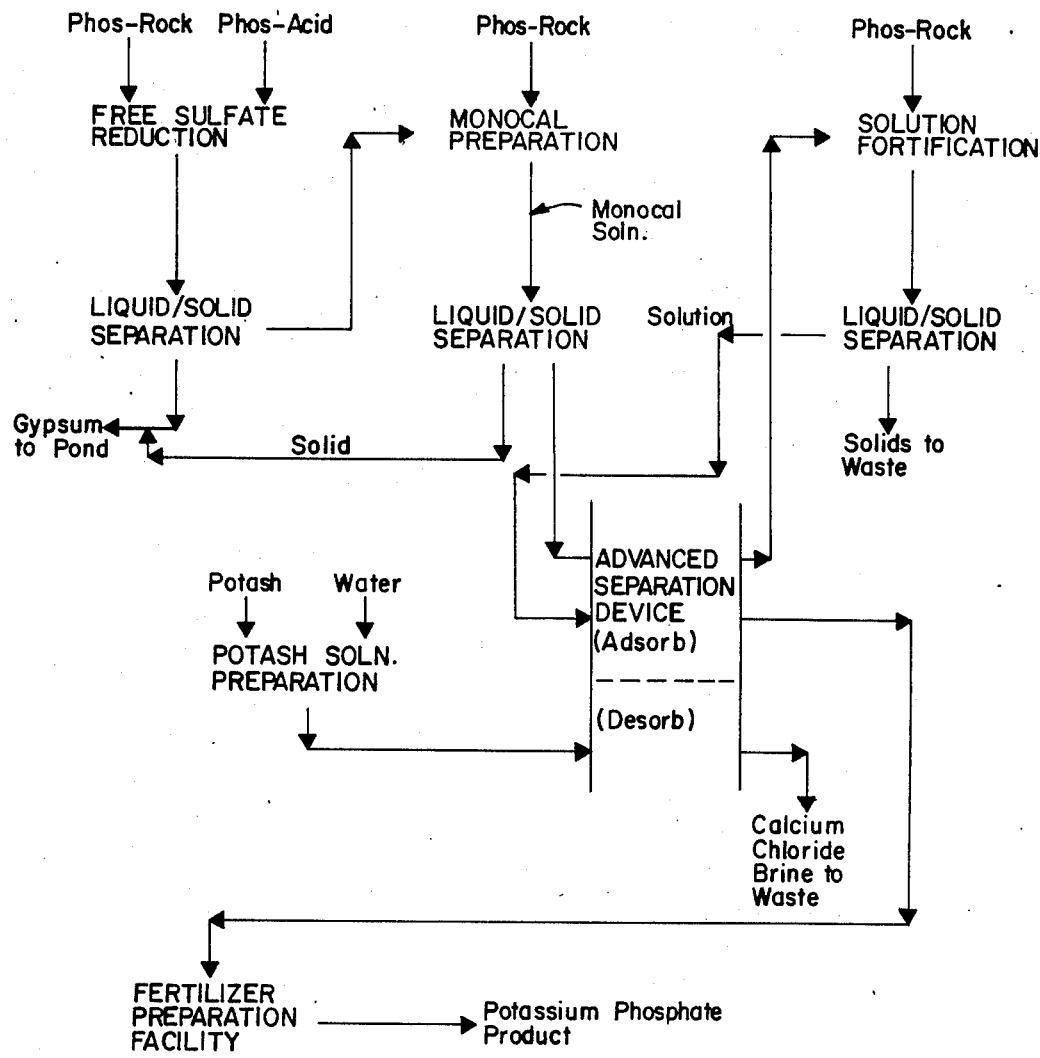
FIG. 1 is a block diagram illustrating the process of the present invention.

Before describing the application of the ASD device to this process, reference is made to the block diagram of FIG. 1 where the overall ion exchange process is set forth. Although the process is described in terms of a calcium phosphate feed, it will be appreciated that any phosphate salt feed material may be used for exchange with the potassium loaded resin so long as the exchange salt of the cation of the the phosphate salt feed is water-soluble.

As shown in FIG. 1, a monocalcium phosphate solution (monocal) is first prepared by combining phosphoric acid and phosphate rock.

Once the solids have been removed from the monocal solution, it is sent to the ASD for contact with a potassium loaded ion exchange resin where an exchange of potassium for calcium and hydrogen occurs so as to produce a resin loaded with calcium and a water soluble potassium phosphate product, which may then be sent off to a fertilizer preparation facility. Due to the unique nature of the ASD, it is possible during this ion exchange stage to fortify the partially exchanged monocal solution, i.e., the solution containing potassium phosphates as well as unexchanged monocal, with additional fresh calcium phosphate material so as to increase the concentration gradient of calcium to potassium thereby increasing the efficiency of exchange.

After stripping the potassium from the resin and replacing it with calcium, a potassium regeneration solution such as potassium chloride is fed into the ASD so as to effect reloading of the resin with potassium while stripping away the calcium in the form of water soluble chloride.

As previously indicated, the starting material may be calcium phosphate solution and more particularly, a monocalcium phosphate (monocal) solution produced by combining phosphate rock and phosphoric acid. Alternatively, the monocal solution may be produced by either combining phosphate rock, sulfuric acid and water or by dissolving superphosphate material (normal or triple) in water and separating any residue.

The phosphoric acid should have a concentration of between 10 and 30% $P_2O_5$ and should be combined with an excess of phosphate rock to ensure that a near saturated solution of calcium phosphate is produced. The phosphate rock itself is a well known and readily available source of phosphate values.

In the process concept shown at FIG. 1, phosphoric acid is first mixed with a small amount of phosphate rock such as 10–20 parts phosphoric acid per part phosphate rock so as to neutralize any sulfuric acid, which is commonly employed in the manufacture of wet-process phosphoric acid. A recycled stream of 10 to 40% gypsum based on the phosphoric acid/phosphate rock mixture may be added to enhance crystal growth during this step. Gypsum may then be separated from the liquid using standard liquid/solid separation devices such as filters, centrifuges and the like.

Additional phosphate rock is then added in excess to the phosphoric acid in order to produce a soluble monocalcium phosphate solution. Generally, about 0.3 to 0.5 parts of additional phosphate rock are added per part of phosphate solution. The degree of calcium saturation will depend on the specific plant requirements. The excess rock present in the media during this reaction can be removed via clarification, filtration, etc. Final adjustment of the calcium/phosphorous ratio can be controlled by either the addition of rock or phosphoric acid to the monocalcium phosphate solution.

The prepared monocalcium solution is then sent to the ASD for contact with a potassium loaded ion exchange resin wherein a calcium loaded resin and potassium phosphates are formed. The flow rate of materials, of course, is highly dependent on the size of the ASD and can be ascertained quite readily. After washing the resin to remove residual amounts of potassium phosphate or calcium phosphate, a potassium chloride regeneration solution is fed into the ASD so as to form $CaCl_2$ brine and a regenerated potassium loaded resin.

The potassium chloride regeneration solution is preferably an aqueous solution containing at least 5% potassium chloride and preferably at least 18% potassium chloride. It will be appreciated that similar potassium salts may be used so long as the corresponding calcium or other metal salt is water-soluble. It has also been observed that hydrogen exchange occurs during this transfer. Following the regeneration step, the resin is again washed for subsequent loading with the calcium phosphate solution.

The process may be carried out at any temperature above freezing and below boiling although the preferred range is 80°–160° F.

Figure 2:
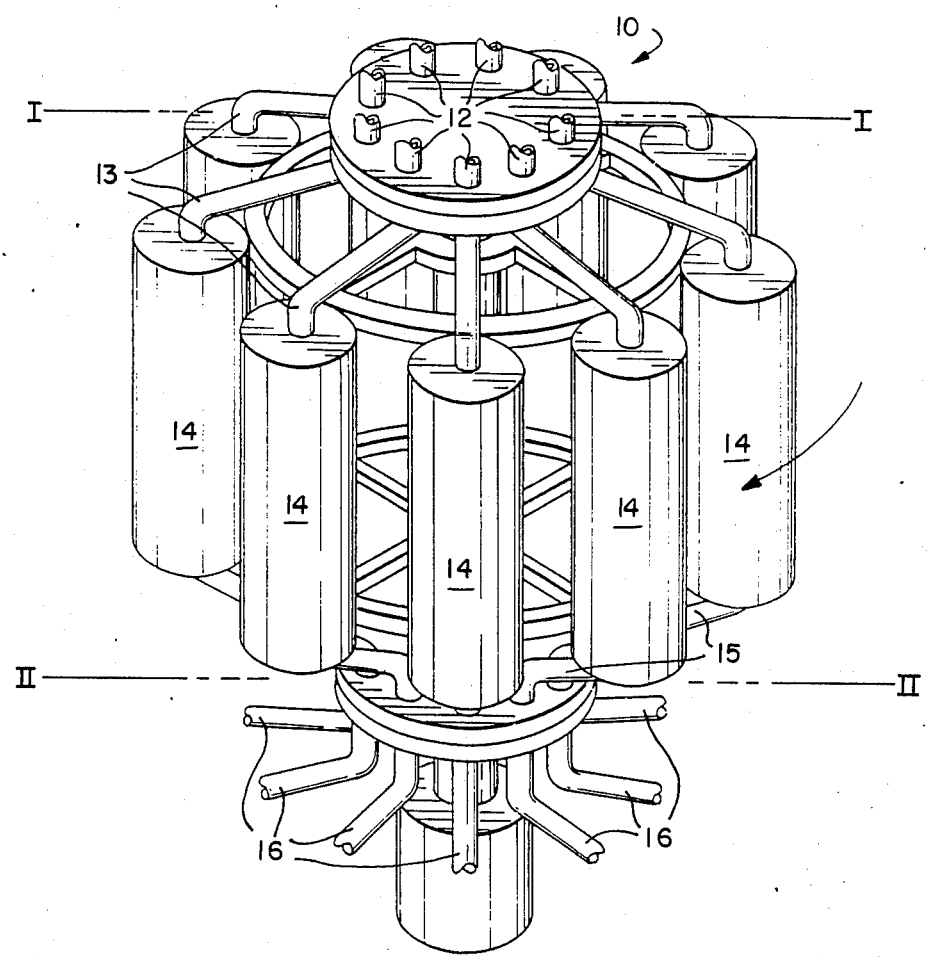
FIG. 2 is a perspective view of the Advanced Separation Device.

The ASD itself, which is fully described in the above-cited application is illustrated in FIG. 2. It comprises a plurality of fixed feed ports 12, to each of which may be supplied various feed materials. In the case of the present invention, these materials include the monocal solution, the washwater feeds and the potassium chloride regeneration fluid.

Moving about a circular path in periodic fluid communication with each of the above-described stationary feed ports are a plurality of chambers 14 filled with an ion exchange material which interacts with the feed fluids. The effluent i.e., the fluid which results from the interaction of the feed materials with the exchange material will hereinafter be referred to as the interaction product. In the process of the present invention, the ion exchange material is a commercial strong or weak cation resin such as the C-26 (strong cation) resin marketed by Rohm & Haas.

It will be appreciated that the feed materials are supplied continuously to their respective feed ports 12 for periodic interaction with resin in each of the chambers 14. In similar fashion, a plurality of stationary discharge ports 16 are provided at an end of the chambers opposite to that of the fixed feed ports 12. Each feed port 12 has a corresponding discharge port 16. After the interaction product passes through a given fixed discharge port, it may be purged from the system, recirculated back to a selected feed port, or a combination of both.

In order to carry out the process of the present invention, the monocal solution, the washwater feeds, and the potassium chloride regeneration solution are each transported to given stationary feed ports so that the resin will be loaded with potassium, washed, contacted with monocal ion exchange solution whereby the potassium from the resin is exchanged with the calcium in the solution, re-washed, then re-loaded with potassium.

In order to carry out the process at optimum efficiency, at least two fixed feed ports and corresponding fixed discharge ports should be provided for both the ion exchange and the regeneration stages. In this way, the interaction products formed from the feed materials and the resin and discharged through a first ion exchange or regeneration discharge port can be fortified or treated in an intra-stage fashion with fresh feed or treatment materials for delivery into a second fixed ion exchange or regeneration feed port.

Thus, referring to FIG. 2, if fresh monocal solution is supplied to ion exchange feed port 12A to yield an interaction product containing potassium phosphate and reduced levels of calcium phosphate, that product, after being discharged through fixed discharge port 16A, may be combined with fresh calcium phosphate material before being supplied to a second fixed ion exchange port 12B. This fortification or intra-stage addition of fresh calcium ion to the interaction product results in increased reaction efficiency since the concentration gradient of calcium phosphate relative to potassium loaded on the resin is substantially increased. Generally, enough fresh calcium phosphate should be added so as to increase its concentration to saturation or near saturation.

In similar fashion, a second interaction product formed from the fortified solution entering fixed ion exchange feed port 12B and the potassium loaded resin may likewise be fortified with still more calcium phosphate material prior to delivery to a third fixed ion exchange feed port. This can be continued until the desired ratio of $K_2O/P_2O_5$ has been attained.

The same intra-stage addition of fresh feed materials may be practiced during the regeneration stage. Thus, when a solution of potassium chloride is fed into a first fixed regeneration feed port and passed through the calcium loaded resin to form an interaction product containing calcium chloride and reduced levels of potassium chloride, that product may likewise be fortified with additional fresh potassium chloride before delivery into a second fixed regeneration feed port. Alternatively, a pH adjusting material may be added in an intra-stage fashion during the regeneration stage to effect neutralization of hydrogen ions generated during the exchange process so as the maximize the reaction efficiency.

Optionally, one or more feed parts will have no fresh materials being supplied thereto but rather, will merely receive effluent which has not been fortified.

The number of chambers and fixed feed and discharge ports is a matter of design choice depending on the types of feed and regeneration materials, the type of resin used, and the size of the ASD. It has been found that twelve to twenty-four inches of a strong cation resin give good results. The flow rates of feed materials are likewise a matter of design choice.

From a practical standpoint, therefore, flow rates for the various feed solutions can range from 2 gpm/ft$^2$ to 20 gpm/ft$^2$, depending on the specific plant requirements.

By virtue of the ASD, it is possible to carry out the contacting of resin and exchange material in somewhat of a differential fashion. More specifically, beyond enabling fortification of the treating fluids in an intra-stage fashion continuously and economically, the ASD essentially enables the process to be carried out with a continuous supply of fresh resin. Accordingly, many of the contraints attendant with conventional exchange systems, i.e., the size of the actual exchange zone and the maximum flow rate which may be achieved are not as limiting with the ASD.

The amount of calcium phosphate material added to the interaction product streams should be between about 0.1 and 0.5 parts by weight per part interaction product.

The final potassium phosphate solution is converted to dry potassium phosphate or ammoniated product by transporting it to a crystallization/granulation circuit. Alternatively, the solution can be used as a feedstock to a liquid fertilizer production operation.

The following Examples are given by way of illustration and in no way should be construed as limiting.

EXAMPLE 1

A set of differential contacting tests were conducted to simulate the intra-stage addition of a calcium phosphate material to the effluent (containing the potassium phosphate product as well as reduced levels of calcium phosphate) discharged from the column containing potassium-loaded resin.

First, an aqueous solution of technical grade phosphoric acid (30% $P_2O_5$) was reacted with excess dicalcium phosphate at a temperature of 140° F. Excess solids were removed from the solution by filtration. The temperature was maintained at 140° F. throughout the test.

600 ml of that solution were then fed into a column containing 200 ml of the C-26 potassium-loaded resin. A small sample of this first effluent was analyzed.

The first effluent was then combined with additional dicalcium phosphate and any excess solids removed by filtration. The amount of dicalcium phosphate added was enough to raise the percent $P_2O_5$ from 29.61% to 32.07% and the percent CaO from 1.94% and 3.69%. This fortified solution was then fed into a second column containing C-26 resin loaded with potassium. A small sample of this second effluent was analyzed.

The second effluent was then mixed with enough additional dicalcium phosphate to raise the percent $P_2O_5$ from 28.08% to 29.20% and to raise the percent CaO from 2.55% to 4.05%. The second effluent was then fed to a third column containing the potassium-loaded resin.

The first 200 ml and the second 200 ml of the effluent from the third column were then separately analyzed.

The results of the above tests are as follows:

TABLE 1

| Sample Test 1 | % $P_2O_5$ | % CaO | % $K_2O$ | Weight Ratio $K_2O/P_2O_5$ |
|---|---|---|---|---|
| 30% Tech Acid | 29.71 | — | — | — |
| 30% Tech Acid after reacting w/Dical. Phos. | 32.74 | 3.00 | 0.00 | — |
| 1st Ion Exchange Pass Composite | 29.61 | 1.94 | 2.35 | 0.08 |
| 1st Composite after reacting w/Dical. Phos. | 32.07 | 3.69 | 2.07 | — |
| 2nd Ion Exchange Pass Composite | 28.08 | 2.55 | 3.67 | 0.13 |
| 2nd Composite after reacting w/Dical. Phos. | 29.20 | 4.05 | 3.30 | — |
| 3rd Ion Exchange Pass-1st 200 ml | 22.12 | 1.24 | 5.56 | 0.25 |
| 3rd Ion Exchange Pass-2nd 200 ml | 30.00 | 3.17 | 4.76 | 0.16 |

As is evident from Table 1, the use of intra-stage (or incremental) addition of a calcium source does allow for a progressive increase in the $K_2O/P_2O_5$ ratio when compared to a single pass situation. Thus, the process may be carried out advantageously in the ASD which makes it possible to simultaneously and continuously add feed materials in an intra-stage fashion to the various effluent streams i.e., during the loading, unloading and washing stages. Such is important since calcium phosphate is not highly soluble in aqueous solutions and thus cannot be incorporated therein at high enough levels.

It should also be noted that the yield of product in the second 200 ml of effluent discharged from the third ion exchange column is significantly lower than that obtained in the first 200 ml increment of the third column. In fact, there was a 14% decrease in the percent $K_2O$ and a 36% decrease in the ratio $K_2O/P_2O_5$ between the first and second 200 ml increments. This decrease demonstrates the low loading capacity of the C-26 resin. As previously indicated, such a low loading capacity resin, although suited for potassium exchange, would nonetheless not be suited to conventional ion exchange systems such as fixed beds due to the unduly large volumes of resin which would be required as well as the difficulties associated with controlling the various flows when incremental fortification of feed materials between the exchange columns is desired. The nature of the ASD, however, effectively allows carrying out the potassium phosphate ion exchange process with low capacity ion exchange resins such as C-26.

EXAMPLE 2

To further demonstrate the benefits derived from intra-stage additives of feed materials to effluent streams, the same tests were conducted as were done in Example 1 except that a 10% $P_2O_5$ solution was prepared by leaching commercial superphosphate material with water.

The results of that test are as follows:

TABLE 2

| Sample Test 2 | % $P_2O_5$ | % CaO | % $K_2O$ | Weight Ratio $K_2O/P_2O_5$ |
|---|---|---|---|---|
| 10% Super Phosphate Leach solution after react. w/Dical. Phos. | 13.10 | 2.53 | 0.20 | |
| 1st Ion Exchange Pass Composite | 12.32 | 2.01 | 2.79 | 0.22 |
| 1st Composite after reacting w/Dical. Phos. | 12.50 | 2.15 | — | — |
| 2nd Ion Exchange Pass Composite (Not Sampled) | — | — | — | — |
| 2nd Composite after reacting w/Dical. Phos. | 12.13 | 1.74 | 3.03 | 0.25 |
| 3rd Ion Exchange Pass Composite | 12.10 | 1.37 | 4.22 | 0.35 |

Note:
In both these tests, the pH of the solutions and KCl regeneration material was acidic indicating that hydrogen was also transferring with calcium.

As with the first Example, a substantial increase in both the percent $K_2O$ and the weight ratio of $K_2O/P_2O_5$ was observed after the incremental fortification with fresh di-cal phosphate.

EXAMPLE 3

An ASD illustrated at FIG. 3 and comprising 12 individual rotating chambers 1.5 in. in diameter. Each chamber was filled with approximately 12–14 in. of the C-26 strong cation resin (1.3 liters). The unit was rotated at a rate of 20 minutes per revolution. The process was carried out at room temperature.

The ASD also had 12 fixed feed and discharge ports. The following Table, in conjunction with FIG. 3, illustrates how the process was carried out.

TABLE 3

| Fixed Port Number | Feed | Feed Rate ft gpm |
|---|---|---|
| 1 | washwater | 6 |
| 2 | washwater | 3 |
| 3 | — | — |
| 4 | calcium phosphate solution | 6 |
| 5 | effluent from 3 and 4 | |
| 6 | effluent from 5 | |
| 7 | — | — |
| 8 | washwater | 6 |
| 9 | — | — |
| 10 | 18% KCl | 4 |
| 11 | effluent from 9 and 10 | |
| 12 | — | — |

The potassium phosphate product was discharged through fixed discharge port 6.

The feed solution for the test was prepared by mixing a 10% solution of technical grade phosphoric acid with dicalcium phosphate and by then allowing the mixture to clarify. The regeneration solution was made from industrial grade potassium chloride.

The results of that test appear as follows:

TABLE 4

| Stream | % P2O5 | % CaO | % K2O | % Cl |
|---|---|---|---|---|
| Calcium Phosphate Solution | 9.63 | 0.96 | — | — |
| Discharge from #4 contacting position | 9.42 | 0.00 | 1.76 | — |
| Discharge from #5 contacting position | 9.24 | 0.00 | 1.84 | — |
| Product Solution (#6 Discharge) | 7.16 | 0.00 | 1.61 | — |
| KCl Regen. Solution Feed | — | — | 12.19 | — |
| Discharge from #10 contacting position | — | — | 7.21 | 7.71 |
| Spent Regen. Solution (#11 Discharge) | — | — | 3.61 | 4.73* |

*pH of spent regen. solution was 0.80 indicating that hydrogen ion transfer occurred.

As the data demonstrate, the response of the ASD compared to a single contact laboratory test, is significantly better from a transfer standpoint. The calcium exchange occurred essentially in the first contact i.e., position number 4.

Coupled with the intra-stage calcium addition tests performed above, it will be appreciated that the level of $K_2O$ in the phosphate solution could be increased by the injection of calcium ion between contacting stages, e.g. adding calcium to the no. 4 and/or no. 5 effluents. The exact configuration, number of stages of contact, degree of intrastage potassium phosphate or regeneration solution treatment and the like will, of course, depend on specific plant or process requirements.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process for producing potassium phosphate comprising the steps of:

(A) providing an Advanced Separation Device having
        (i) a regeneration fluid feed port and at least two ion exchange fluid feed ports as well as corresponding regeneration fluid and ion exchange fluid discharge ports;
        (ii) a plurality of resin-filled chambers disposed between and moving about a circular path in periodic fluid communication with said feed and discharge ports;
    (B) supplying a metal phosphate salt ion exchange fluid to at least one of said at least two exchange fluid feed ports for delivery into chambers containing resin loaded with potassium, the metal of the phosphate salt having a greater affinity for said resin than the potassium and thereby being exchanged with the potassium to form a resin loaded with said metal and an interaction product including potassium phosphate and unexchanged ion exchange fluid which is discharged through at least one of said at least two ion exchange fluid discharge ports;
    (c) fortifying the interaction product with additional metal phosphate salt and supplying the fortified Iinteraction product into at least one ion exchange feed port subsequent to the ion exchange feed ports supplied in step (B) to form a second interaction product including potassium phosphate and unexchanged ion exchange fluid, the second interaction then being discharged from the Advanced Separation Device;
    (D) supplying a regeneration fluid containing a salt of potassium and an anion to said regeneration fluid feed port for delivery into chambers containing resin loaded with the metal of said phosphate salt, the potassium of said regeneration fluid having a greater affinity for said resin and thereby being exchanged with said metal to form resin loaded with potassium and a second interaction product comprising a water-soluble salt of said metal and said anion and unexchanged regeneration fluid which is discharged through said regeneration fluid discharge port.

2. The process of claim 1 wherein said Advanced Separation Device further has at least one of an ion exchange washing fluid feed port and a regeneration washing fluid feed port as well as corresponding ion exchange and regeneration washing fluid discharge ports, a washing fluid being supplied to said at least one ion exchange or regeneration washing fluid feed ports for delivery into said resin-filled chambers so as to remove residual amounts of water-soluble salts contained therein, said residual amounts being discharged through said at least one ion exchange or regeneration washing fluid discharge ports.

3. The process of claim 2 wherein said Advanced Separation Device comprises at least two regeneration fluid feed and discharge ports, the second interaction product, comprising the water-soluble salt of the metal and the anion and the unexchanged regeneration fluid, being discharged from one of said at least two regeneration fluid discharge ports and then being fortified with additional salt of potassium and the anion prior to being fed into a regeneration fluid feed port subsequent to one of said at least two regeneration fluid feed ports.

4. The process of claim 1 wherein the resin is a strong cation resin.

5. The process of claim 1 wherein said metal phosphate salt ion exchange fluid comprises calcium phosphate, magnesium phosphate, or iron phosphate.

6. The process of claim 5 wherein said metal phosphate salt ion exchange fluid is a saturated or near saturated solution.

7. The process of claim 5 wherein said calcium phosphate ion exchange fluid is prepared by combining 10 to 35% phosphoric acid with excess phosphate rock.

8. The process of claim 5 wherein said calcium phosphate ion exchange fluid is prepared by combining phosphate rock, concentrated sulfuric acid and water.

9. The process of claim 1 wherein said regeneration fluid salt is at least 5% by weight potassium chloride or other potassium salt having an anion which forms a water soluble salt with the metal of said metal phosphate salt.

10. The process of claim 1 wherein said regeneration fluid salt is at least 18% potassium chloride.

11. The process of claim 1 wherein the potassium phosphate and unexchanged metal phosphate salt discharged from one of said at least two ion exchange discharge ports is fortified with enough fresh metal phosphate salt to raise the concentration thereof to saturation or near saturation.

12. The process of claim 7 further comprising the steps of:
 (A) adding gypsum to said phosphoric acid and phosphate rock solution;
 (B) separating said gypsum from said solution once calcium phosphate has crystallized;
 (C) adding additional phosphate rock to said solution.

13. The process of claim 1 wherein potassium phosphate produced and discharged from said ion exchange discharge port is transferred to a crystallization/granulation circuit for conversion to dry potassium phosphate or ammoniated product.

14. The process of claim 1 further including the step of repeating the fortifying step (C) to produce a third or additional interaction products.

* * * * *